No. 883,487. PATENTED MAR. 31, 1908.
J. ROBSON.
AMMONIA APPARATUS.
APPLICATION FILED MAY 3, 1907.

11 SHEETS—SHEET 1.

Witnesses.

Inventor
John Robson
by R. Hadden
Attorney

No. 883,487. PATENTED MAR. 31, 1908.
J. ROBSON.
AMMONIA APPARATUS.
APPLICATION FILED MAY 3, 1907.

11 SHEETS—SHEET 2.

Witnesses
Inventor
John Robson
Attorney

No. 883,487. PATENTED MAR. 31, 1908.
J. ROBSON.
AMMONIA APPARATUS.
APPLICATION FILED MAY 3, 1907.

11 SHEETS—SHEET 3.

No. 883,487.

J. ROBSON.
AMMONIA APPARATUS.
APPLICATION FILED MAY 3, 1907.

PATENTED MAR. 31, 1908.

11 SHEETS—SHEET 4.

Witnesses
Inventor

No. 883,487. PATENTED MAR. 31, 1908.
J. ROBSON.
AMMONIA APPARATUS.
APPLICATION FILED MAY 3, 1907.

11 SHEETS—SHEET 6.

Witnesses
Inventor

No. 883,487. PATENTED MAR. 31, 1908.
J. ROBSON.
AMMONIA APPARATUS.
APPLICATION FILED MAY 3, 1907.

11 SHEETS—SHEET 7.

Witnesses
Inventor
John Robson
by
Attorney

No. 883,487. PATENTED MAR. 31, 1908.
J. ROBSON.
AMMONIA APPARATUS.
APPLICATION FILED MAY 3, 1907.

11 SHEETS—SHEET 8.

Witnesses

Inventor
John Robson
by R Haddan
Attorney

No. 883,487. PATENTED MAR. 31, 1908.
J. ROBSON.
AMMONIA APPARATUS.
APPLICATION FILED MAY 3, 1907.

11 SHEETS—SHEET 9.

Witnesses

Inventor

No. 883,487.  
J. ROBSON.  
AMMONIA APPARATUS.  
APPLICATION FILED MAY 3, 1907.

PATENTED MAR. 31, 1908.

11 SHEETS—SHEET 11.

UNITED STATES PATENT OFFICE.

JOHN ROBSON, OF WALLSEND, ENGLAND, ASSIGNOR TO CLARKE CHAPMAN & COMPANY LIMITED, OF DURHAM, ENGLAND.

AMMONIA APPARATUS.

No. 883,487.

Specification of Letters Patent.     Patented March 31, 1908.

Application filed May 3, 1907. Serial No. 371,651.

*To all whom it may concern:*

Be it known that I, JOHN ROBSON, a subject of the King of England, residing at Wallsend, Northumberland, England, have invented a certain new and useful Ammonia Apparatus, of which the following is a specification.

This invention relates to improvements in ammonia apparatus specially adapted for the propulsion of submarine vessels, but can be used to advantage for propelling other vessels and consists substantially in the combinations of parts and constructions hereinafter described and more specifically pointed out in the claims.

Figure 1:
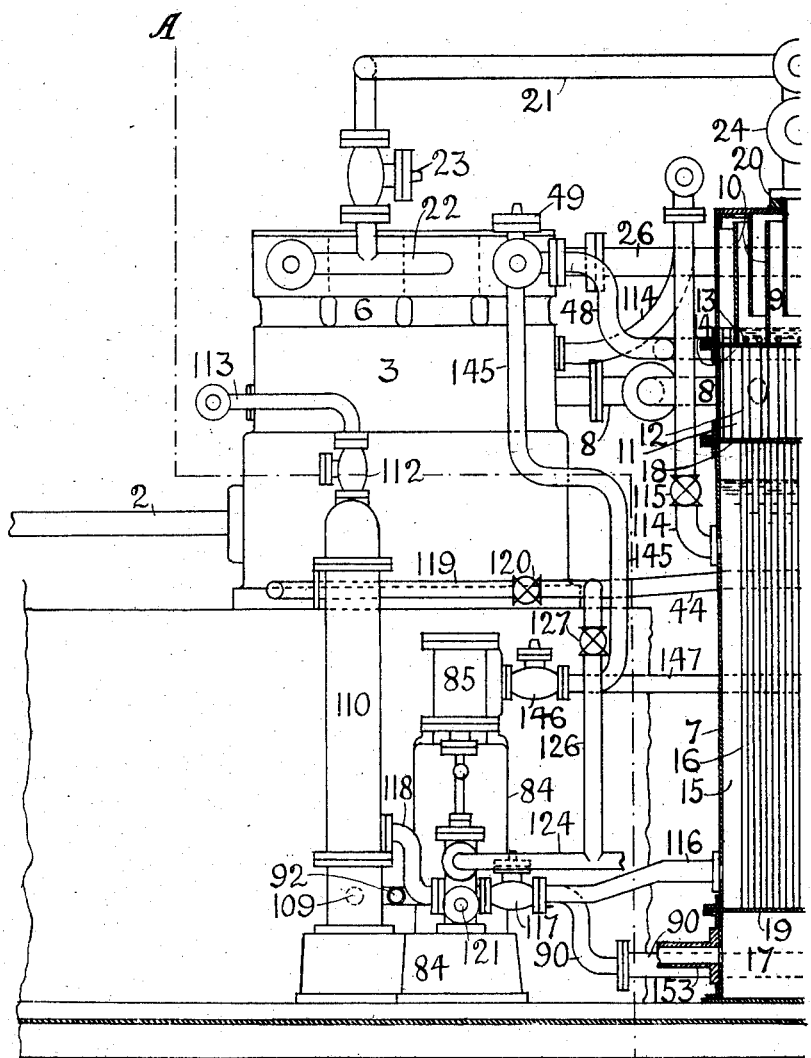
Figure 2:
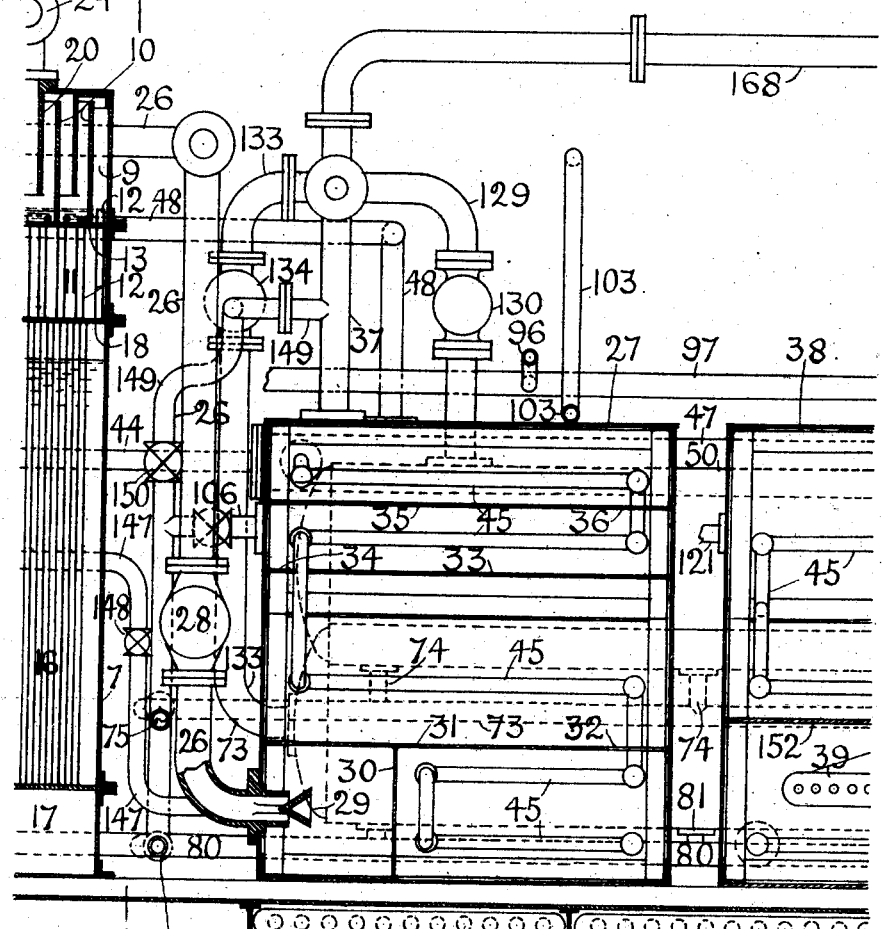
Figure 3:
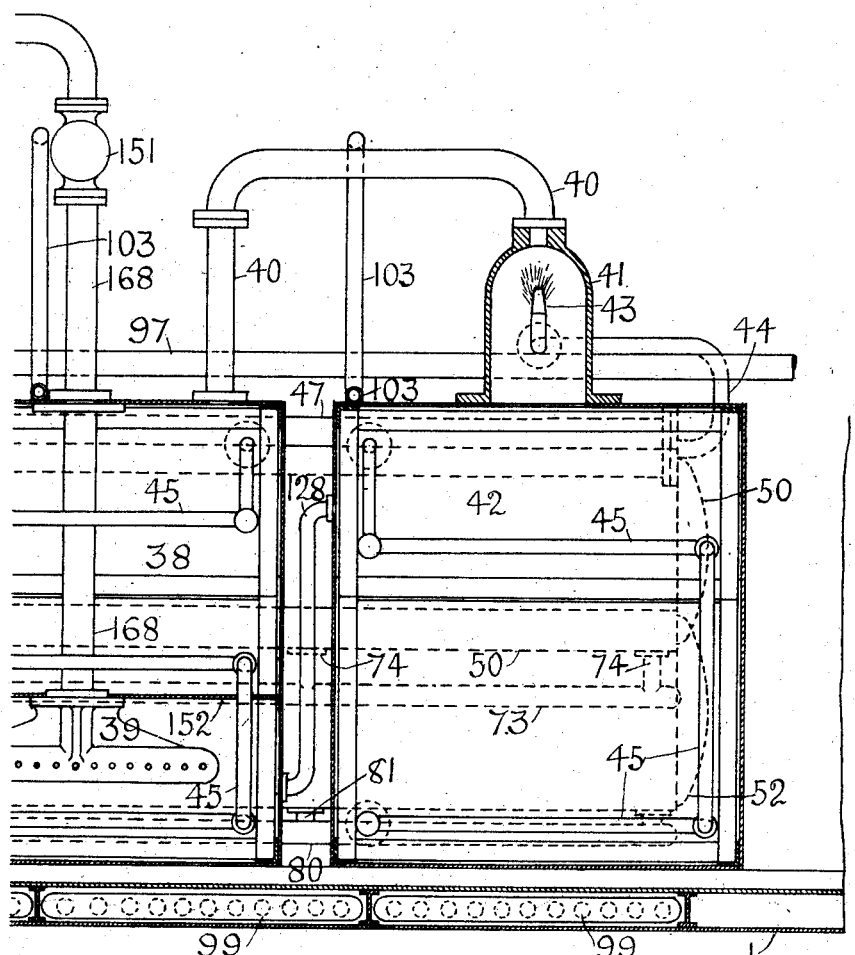
Figure 4:
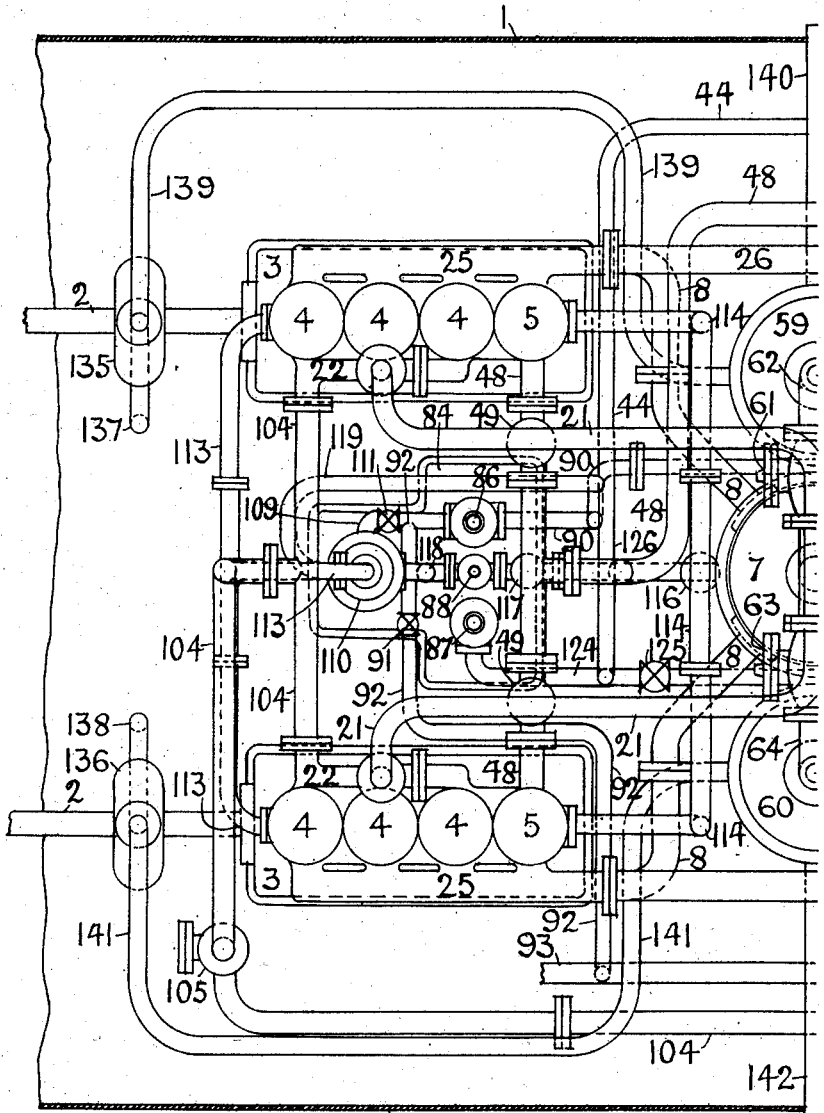
Figure 5:
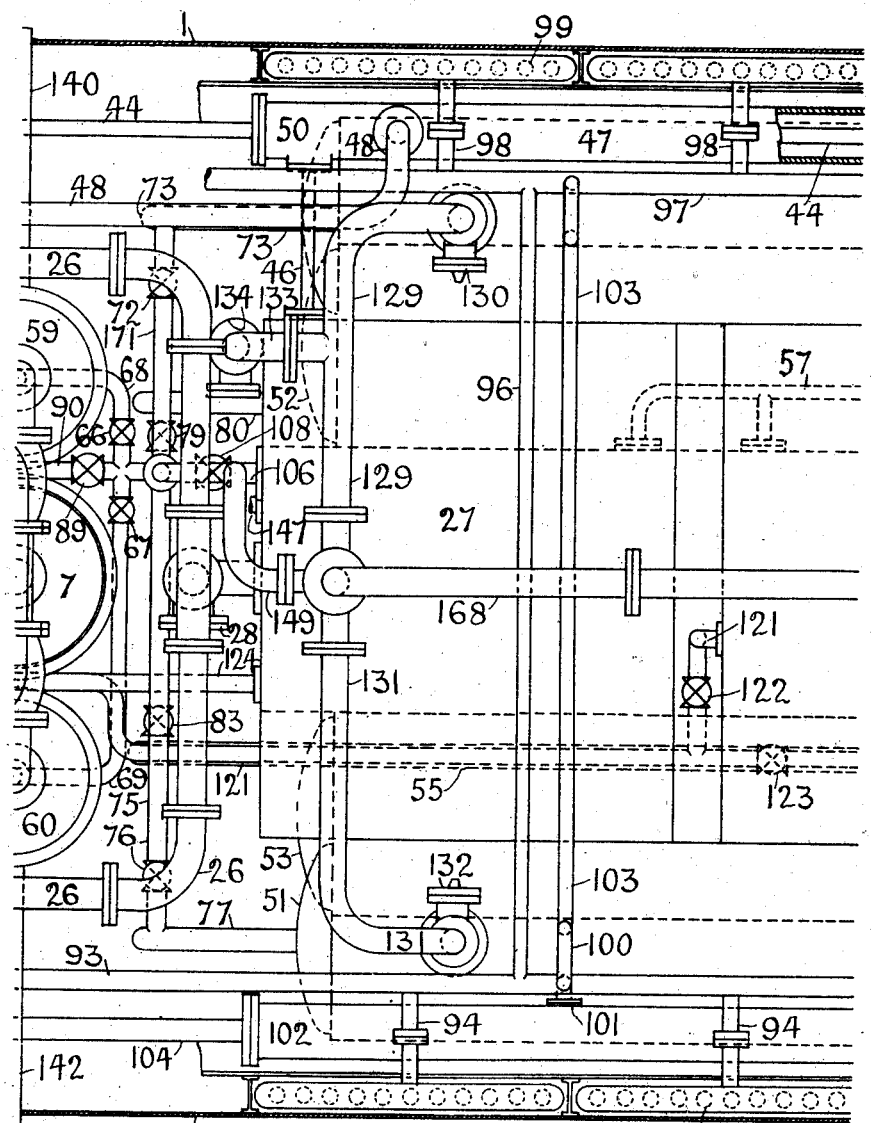
Figure 6:
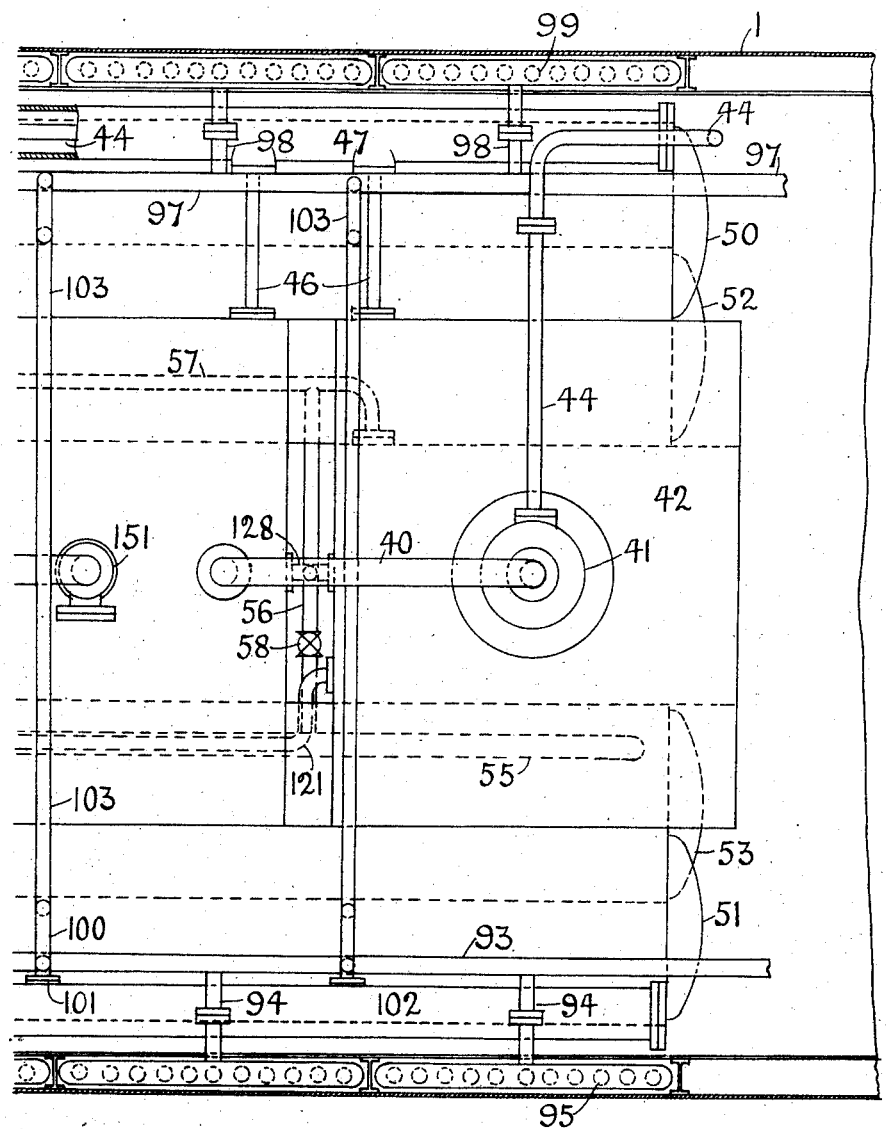
Figure 7:
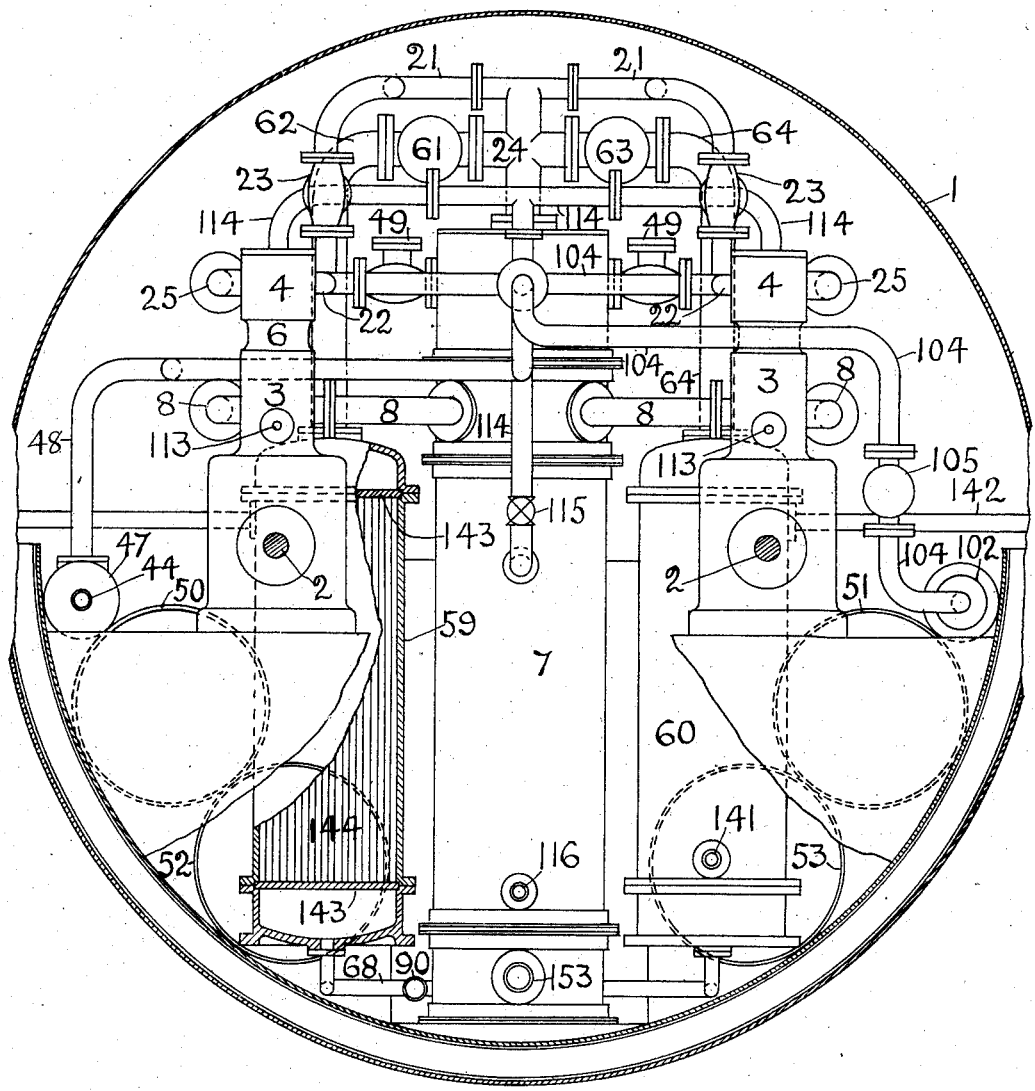
Figure 8:
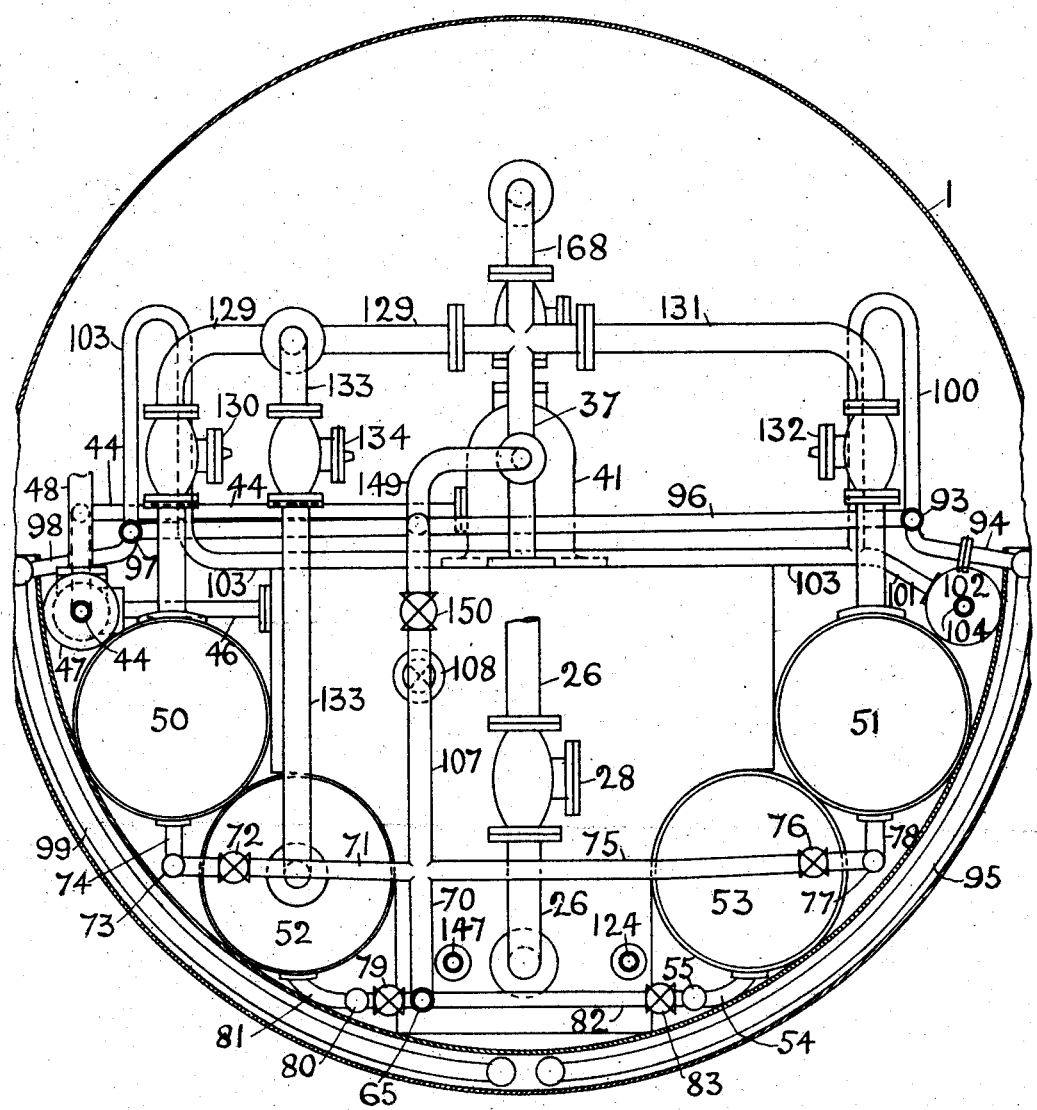
Figure 9:
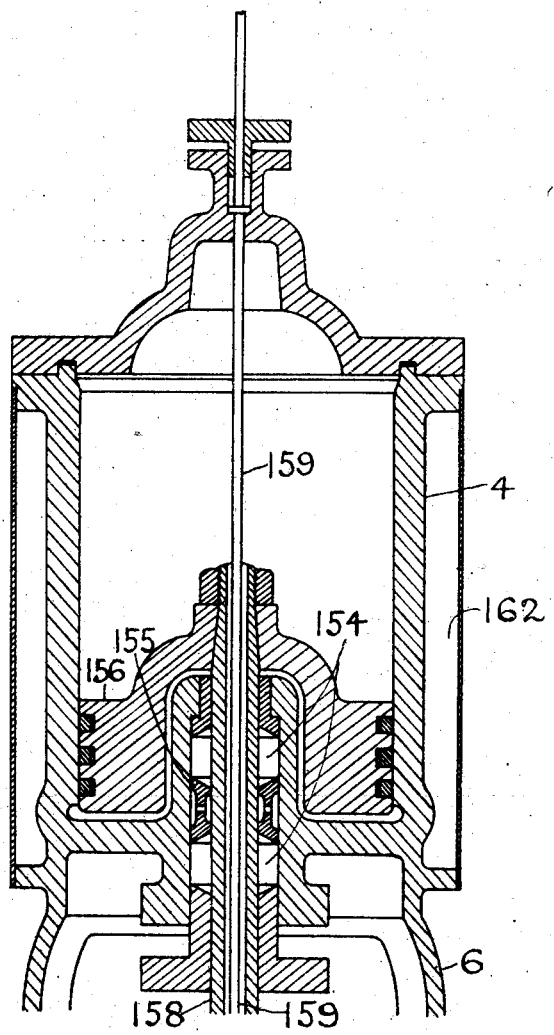
Figure 10:
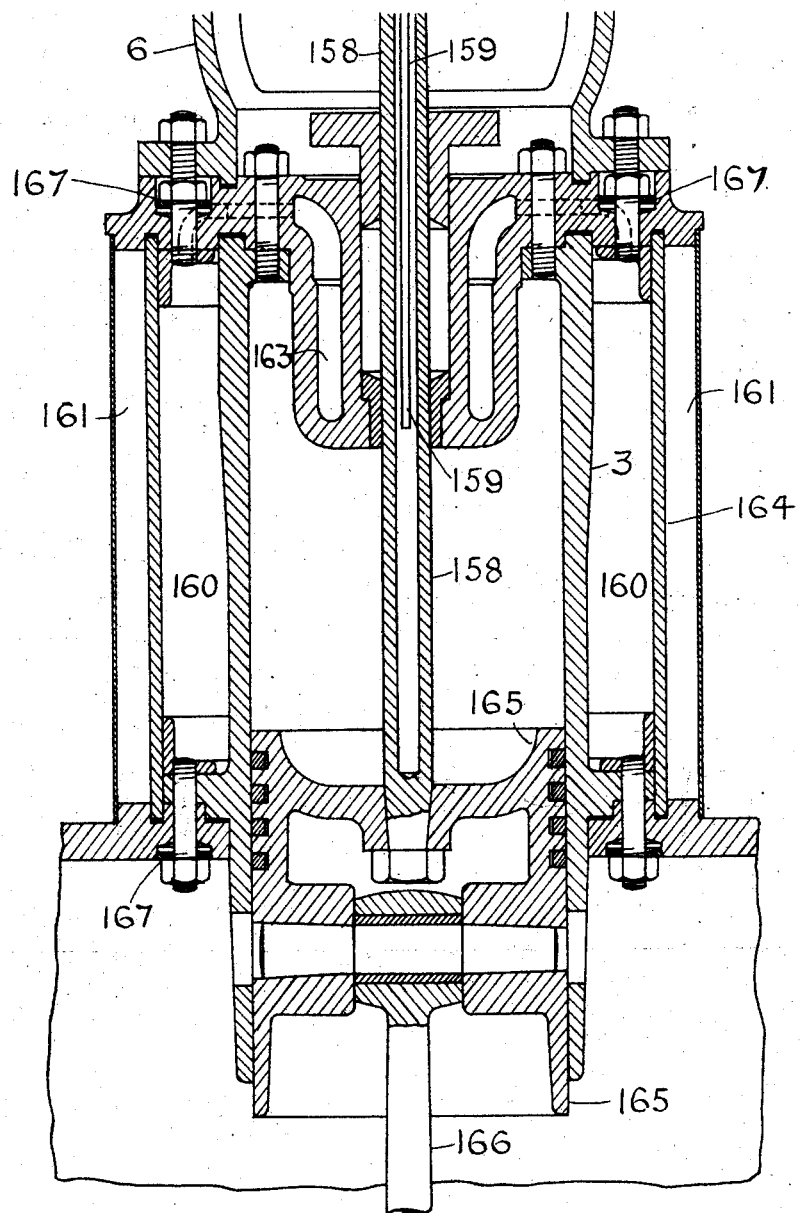
Figure 11:
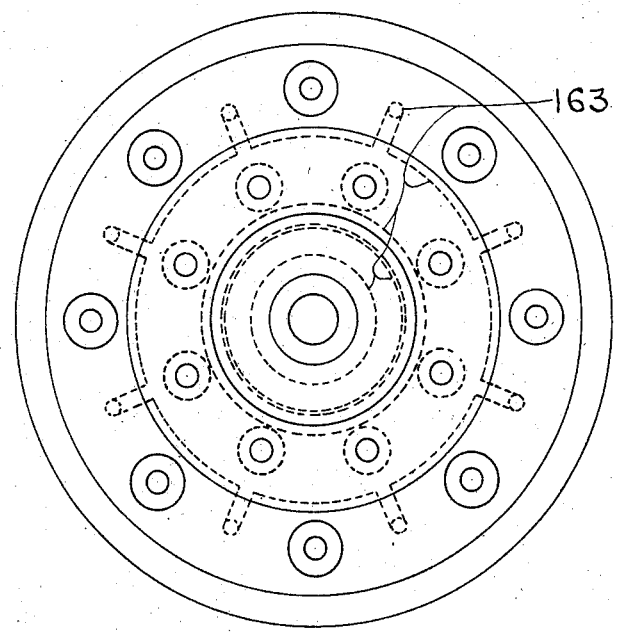

Referring to the accompanying drawings, Figures 1, 2 and 3 are separate sectional elevations showing together the entire plant. Figs. 4, 5 and 6 are plan views of Figs. 1, 2 and 3 respectively. Fig. 7 is a cross section on line A—A of Fig. 1 and Fig. 8 is a similar view on line B—B of Fig. 2. Figs. 9 to 11 show details of construction of the ammonia and oil cylinders, Fig. 9 being a vertical section through the ammonia cylinder, Fig. 10 a similar section through the oil cylinder and Fig. 11 a plan view of top of the oil cylinder, with the space casting between the two cylinders removed.

In said drawings 1 indicates the shell or skin of a submarine vessel and 2 the propeller shafts therefor.

The apparatus comprises oil motors 3 of the known type for propelling submarine vessels, having applied thereto however ammonia cylinders 4, 5 which may be of the tandem type, having their piston rods connected to the trunks of the oil motors. The space or spaces 6 between the cylinders may be inclosed and communicate by a pipe with the absorbers as hereinafter described for the purpose of absorbing any gas which may accumulate therein.

8 designates the exhaust from the oil motors.

Adjacent the motors is located the ammonia generator comprising a cylindrical vessel 7 inclosing a number of small steel tubes 16 expanded into tube plates 18 and 19 therein, and the heat from the water jacket and exhaust 8 of the oil motor may be used for producing pressure, in said generator, for which purpose the latter is provided with a chamber 11 having an outer circle of tubes 12, and into the chamber 11 the exhaust from the oil motors enters through a pipe or pipes and having imparted its heat to the liquid in said generator is exhausted at the lower end thereof through the pipe 153 Figs. 1 and 7. 14 indicates a tube plate through which the tubes 12 pass.

The upper part 9 of the generator is provided with a number of baffles 10 forming a water separator, the spaces between such baffles communicating through holes 13 with the outer circle of tubes 12 which pass through the above mentioned exhaust chamber 11, said tubes 12 projecting beyond the top tube plate 14 for a certain distance to allow water to accumulate and seal said holes, the arrangement being such that when the water reaches the top of said tubes it will pass into the lower chamber 15 of the generator to mix with the general solution. The gas given off from the ammonia and water solution in the body 7 of the generator passes off through a central pipe 20 at the upper part thereof and branch pipes 21 and 22 to the ammonia cylinders 4 before mentioned. Stop valves 23 are provided between the pipes 21 and 22, and 24 represents a further branch pipe between the pipes 21 and 20.

25 indicates exhaust chambers for the motor cylinders 4 and 5 and the exhaust therefrom passes through the pipe 26 having a non-return valve 28 into the bottom of the first absorber 27 being split up by a spreader 29 therein. This absorber is preferably of the type described in the specification of my previous Letters Patent No. 344087, filed 19 November 1906, being provided at its lower part with a vertical perforated plate 30 and with a number of horizontal baffle plates 31, 33 and 35 provided with openings 32, 34 and 36 respectively, at alternate opposite ends as shown in Fig. 2 the exhaust gas passing through said vertical perforated plate and the apertures in the horizontal plates being thus caused to travel from side to side of the absorber till it reaches the top where, should any gas remain unabsorbed, it passes off by pipes 37 and 168, the latter having a non-return valve 151, into and through a perforated pipe or rose 39 at the bottom of the second absorber 38 then rises upwards through a perforated plate 152 therein to the top, finally passing off by a pipe 40 to a chamber 41, at the top of the third or last absorber 42, where it is met by a jet of cold weak ammonia solution sprayed into said chamber 41 through a pipe 44 and nozzle 43. By this means all the gas will become absorbed and the liquid will settle in this last absorber 42.

The absorbers 27, 38 and 42 are provided with refrigerating coils 45 supplied with anhydrous ammonia from a suitable receiver and the ammonia evaporated in said coils passes through pipes 46, into a tube 47 and the gas which accumulates in said tube passes to the ammonia cylinders 5 through pipe 48 giving off a portion of its heat for work in the motors, and is afterwards exhausted into the bottom of the first absorber as hereinafter described.

49 designates stop valves in the pipe 48. Several other receivers 50, 51, 52 and 53 are provided for the storage of anhydrous ammonia for propulsion of the vessel when the latter is below the surface of the water and the supply from one or more of these receivers may be used for cooling the absorbers as above mentioned. The connections are as follows: 54 indicate pipes leading from the storage tank 53 to a receiving pipe 55 and 56 pipes from the latter to the coil supply pipe 57, stop valves 58 being provided in said pipes 56. When all the anhydrous ammonia has been evaporated from the receivers and the vessel is again brought to the surface they may be recharged by liquefying the ammonia produced in the generator 7 by passing it into liquefiers or condensers 59 and 60 from which it passes into each of the receivers, the communication being controlled by suitable valves or the like. For this purpose the connections may be arranged as follows: 61 is a stop valve next the aforesaid branch-pipe 24 and 62 a pipe between said valve and the liquefier 59. 63 is a second stop valve next pipe 24 and 64 a pipe leading therefrom to the liquefier 60. 65 designates a branch pipe, and 66 and 67 are stop valves in pipes 68 and 69 respectively leading from the bottom of the liquefiers 59 and 60 respectively to said branch pipe 65 which is in communication with the receiver 50 by means of pipes 70 and 71, stop valve 72, pipe 73 and branches 74. The branch pipe 65 is also in communication with the receiver 51 through pipes 70 and 75, stop-valve 76 pipe 77 and branches 78, with the receiver 52 through stop-valve 79 pipe 80 and branches 81, and with the receiver 53 through pipe 82, stop-valve 83, pipe 55 and branches 54. The liquefiers contain tubes 144 let into tube plates 143 as shown in Fig. 7.

A pump is provided and arranged so that it can suck the ammonia from any of the receivers and deliver it to evaporating coils, so located as to be surrounded by the seawater which passes into a semi-annular space in the vessel through a small aperture preferably near the bow end. The flow of water is regulated through an outlet at the stern, a suitable arrangement of valves being also provided for closing both inlet and outlet when required. The evaporating coils are so arranged as to be capable of withdrawal for examination and repairs. The said pump is mounted on a bed-plate and standard 84 and the cylinder 85. thereof works the two barrels 86 and 87 and a measuring valve 88. The barrel 86 sucks the ammonia from any of the receivers through the aforesaid branch pipes 65 stop valve 89 and pipe 90 and delivers through the stop-valve 91 and pipe 92 into pipe 93 through branches 94 into the evaporating coils 95; and from pipe 93 through pipe 96 into pipe 97 through branches 98 into other evaporating coils 99.

The gas produced by the evaporation in the coils 95 and 99 is conveyed to the ammonia cylinders 4 and after doing work therein is exhausted into the first absorber 27 for instance in the following manner. The gas evaporated in the coils 95 is delivered through branches 94 into the pipe 93 and thence by pipes 100 into other pipes 101 to a tube 102. The gas evaporated in the other coils 99 is delivered through branches 98 into pipe 97 and thence by pipes 103 connecting the pipes 101. The said tube 102 is in communication with a pipe 104 which conveys the gas to the ammonia cylinders 4. A stop valve 105 is provided in the pipe 104. The gas exhausts from cylinders 4 through chamber 25 and pipe 26 into absorber 27.

The pump when not in use for supplying the evaporating coils as described, that is to say, when the boat has risen to the surface, is used for sucking strong ammonia solution from the first absorber 27 and conveying it into a heat interchanger 110 adjacent to the pump, from which interchanger it passes through a non-return valve to the water jackets of the oil motors and absorbing heat therein passes through a pipe and non-return valve to the generator. This may be effected as follows, viz: through pipe 106 leading from the absorber to a vertical pipe 107 which is a continuation of the pipe 70 before referred to, a stop-valve 108 being provided in pipe 106. 109 indicates a pipe leading from the pump barrel 86 to the bottom of the heat interchanger and provided with a non-return stop valve 111. 112 designates the non-return valve at the upper part of the heat interchanger 110 and 113 the pipe leading therefrom to the water-jackets of the oil motors 3. Pipes 114 provided with non-return valve 115 lead from said water jackets to the generator 7. Simultaneously with the above operations the corresponding or proportional quantity of weak ammonia solution is discharging from the bottom of the generator 7 by a pipe 116 having a regulating valve 117 through the measuring valve 88 which is preferably of the construction described in the specification of my previous Letters Patent No. 344087 above mentioned, from which valve it enters the heat-interchanger 110 by a pipe 118 communicating with the casing thereof surrounding the tubes therein containing the strong and cold ammonia from the first absorber 27. The hot solution from the generator 7 after being cooled, passes out of the heat interchanger 110 through a pipe 119 having a stop valve 120 and connecting with pipe 44 inclosed in the tube 47 containing the gas evaporated from the refrigerating coils 45 of the absorbers, as previously explained. The solution is thus cooled and ultimately delivered by the nozzle 43 in the form of spray to the chamber 41 in communication with the last absorber. The strong solution pumped from the first absorber is replaced by the pump barrel 87 communicating with the second and third absorbers near the top thereof and the solution is delivered by a pipe 124 into the bottom of the first absorber. For this purpose the following connections etc. may be made. 121 is a suction pipe leading from the absorbers 38 and 42 to the pump-barrel 87, and stop-valves 122 and 123 are provided for cutting off the suction from the absorbers 38 and 42 respectively. 124 designates the delivery pipe from pump-barrel 87 to the bottom of absorber 27 and 125 a stop-valve in said pipe 124. The latter is connected to the pipe 44 before referred to by a pipe 126 provided with a stop valve 127, and the bottom of the absorber 38 is connected to top of absorber 42 by means of a pipe 128. The pump is so constructed or arranged that the quantity pumped can be reduced or increased as required, the valves being operated to force back the quantity not required in the first absorber into the second absorber. This may be effected by means of tappet valve gear, the tappets being adjusted to open and close the valves according to the quantity required.

The condensers 59, 60 above mentioned are each provided with a separate circulating pump 135, 136 respectively, the delivery pipes of which are connected to the bottom of the condenser casings, and the discharge pipes from the latter to the top of said casings, so that the water circulates round the outside of the condenser tubes. This may be effected by the following pipe system. 137 and 138 indicate the suction pipes to the circulating pumps 135 and 136; 139 is the delivery pipe from pump 135 to the bottom of tube chamber of condenser 59; 140 the discharge pipe from the top of the latter; 141 the delivery pipe from pump 136 to the bottom of tube chamber of condenser 60, and 142 the discharge pipe from the top of said condenser 60. The following connections and valves are also provided for linking up the various elements viz: Pipe 129 having stop valve 130 connects receiver 50 to pipe 37 leading to first absorber; pipe 131 having stop-valve 132 connects receiver 51 to pipes 37 and pipe 133 with stop valve 134 connects the receiver 52 to said pipe 37. 145 indicates the pressure pipe from pipe 48 to pump cylinder 85 (Fig. 1) and having a stop valve 146; 147 is the exhaust pipe with non-return valve 148 from cylinder 85 to bottom of absorber 27. 149 a pipe connecting vertical pipe 107 to pipe 37 leading to first absorber and 150 a stop valve in said pipe 149.

Referring to Figs. 9, 10 and 11 the cylinders of the oil motor and the ammonia cylinders are shown in combination. 4 indicates the ammonia cylinder and 3 the cylinder of the oil motor. The ammonia cylinder has double stuffing boxes 154, with a distance piece 155 located between them into which oil is forced under pressure. The space 6 between the two cylinders is closed by suitable doors and a pipe communicating with the ammonia absorber is connected to the said space.

157 indicates a stuffing box for the oil motor cylinder. The piston rod 158 is hollow and a tube 159 enters said rod to a suitable clearance distance from the bottom thereof when the engine is at the upper dead center. By means of a suitable cam arrangement an injection of anhydrous ammonia takes place at every top stroke. The said ammonia is instantly flashed into vapor owing to the heat of the piston rod, producing the necessary cooling effect to said piston rod and producing power or doing work above the ammonia piston 156.

160 is the cooling jacket for the cylinder 3 which in this case is supplied with ammonia in solution with water, and 164 is an annular steel shell which forms the outer part of said jacket. The spaces 161 and 162 surrounding the jacket 160 and cylinder 4 respectively are filled with a suitable non-conducting material such as asbestos.

The oil motor stuffing box 157 is surrounded by ammonia solution in the space 163 shown also in dotted lines in Fig. 11.

167 shows a method of packing the studs with nut and washer. Lead or any suitable packing may be inserted in the stuffing box.

165 indicates the piston in cylinder 3 and 166 is connecting rod.

The action or cycle of operations of the apparatus is as follows: Before starting the apparatus the first absorber 27 must be about half filled with water and the second and third absorbers 38 and 42 should be about three quarters full; the receivers 50 51 52 and 53 must be charged with anhydrous ammonia, the generator 7 should be charged up to the required level with ammonia and water in about equal proportions, and the evaporating coils 95 and 99 should be also charged with anhydrous ammonia.

If the temperature of the sea-water be say 50° Fahrenheit a pressure of 74 pounds per square inch above atmosphere will be raised and fill the horizontal ammonia vapor receiver or tube 102, this pressure is due to the evaporation of the anhydrous ammonia in the coils 95 and 99 and the vapor is conveyed from tube 102 through the pipes 104 to the ammonia cylinders 4 of the oil motors 3, the adjacent cylinders 5 being at the same time open to communication with the opposite horizontal ammonia vapor receiver or tube 47 which communicates by the pipes 46 with the coils 45 in the absorbers 27, 38 and 42. These coils are supplied through the pipes 56 and 57 with anhydrous ammonia from the receiver 53. The valves for admitting the ammonia vapor to the cylinders 4 and 5 should both be operated by the same lever or other mechanical appliance which may be used for starting and stopping the motors.

The cycle to be now described is that which would be adopted when the boat is submerged. The ammonia vapor under pressure, coming from the two sources above mentioned is admitted by the same valve lever to the cylinders 4 and 5, which work similarly to a double-acting steam engine and drive the propeller shafts 2, the exhaust ammonia vapor being passed away by the pipes 26 and through the non-return valve 28 into the absorber 27. Any vapor not absorbed in 27 is passed out by the pipe 37 and spread by the rose pipe 39 at the bottom of the absorber 38 and should any vapor now remain unabsorbed it will pass out by the pipe 40 into the chamber 41 meeting at the entrance a jet of cold weak solution which is drawn by the pump barrel 86 from the bottom of the absorber 42 and delivered into the pipe 44 to form the jet at 43 which will absorb the whole of the vapor in absorber 42.

The feed of anhydrous ammonia to the evaporating coils 95 and 99 is maintained by the pump barrel 86 the suction of which communicates with the cylinders 50, 51, 52 and 53 and the delivery to pipe 93 which supplies the coils 95 and 99. When the contents of receiver 50 has been evaporated the solution in absorber 27 will be completely saturated and the excess vapor having become absorbed in the absorbers 38 and 42 the solution will also have increased in bulk nearly to the top of 27. The valve 130 must now be opened to allow the strong ammonia solution to overflow from the top of 27 into the empty receiver 50 and at the same time the suction of the feed pump for the coils 95 and 99 is opened to the receiver 51.

To enable the absorber 27 to absorb more vapor and also the strong solution at the top thereof to overflow into receiver 50 a valve 125 on the delivery pipe 124 which enters the absorber 27 near the bottom must be opened to allow a portion of the weak solution passing from the absorber 42 which forms the jet 43 to enter the bottom of absorber 27. When the anhydrous ammonia in receiver 51 becomes exhausted the receiver 52 may be turned on and when 50 is filled with the ammonia solution the valve 132 can be opened whereupon the receiver 51 will receive the overflow from 27 after which the valve 134 must be opened and the receiver 52 filled with the strong ammonia solution. The absorbers 38 and 42 will then be charged, after which the receiver 53 will be emptied, the whole of the ammonia will become absorbed in the water, and the boat must now come to the surface. The temperature of the exhaust ammonia vapor on entering the absorbers will be at least 10° F. below zero yet the latent heat of the gas would soon cause the absorbers to become too hot, therefore the anhydrous ammonia is passed from the receiver 53 into the absorber coils 45 where it takes up its heat of vaporization from the solution in the absorbers, whereupon the gas is passed to the cylinders 5 where it is expanded and does work thus cooling the absorbers.

The next cycle of operations to be described is that which is adopted when the boat is upon the surface of the water. The oil motors can be run as internal-combustion engines directly coupled to the propeller shafts and can be started or reversed by the ammonia cylinders, sufficient anhydrous ammonia still remaining in the evaporating coils 95 and 99 to allow a considerable number of maneuvers to be executed when working in combination with the oil motors on first coming to the surface. The reversing gear on the ammonia cylinders can with the same movement also reverse the cams which actuate the valves of the oil motors. The oil motors must be run for a short time to enable the exhaust gases to heat up the generator 7. The exhaust passes from the oil motors by the pipes 8 to the chamber 11 of the generator, then passes through the tubes 12 to the bottom and after imparting its heat to the strong ammonia solution contained in the body of the generator the remaining gases will pass out by the pipe 153 to the atmosphere from any convenient part of the boat. The pump barrel 86 may draw the strong ammonia solution from any of the receivers 50 51 and 52 or from the absorber 27 by the pipe 90 and passing it through the heat interchanger 110 then to the jackets of the oil motors by the pipes 113 and after having taken up the heat from the jackets it is passed out by the pipes 114 to the non-return valve 115 and finally into the generator. At the same time a regulated quantity of weak ammonia solution is passed out at the bottom of the generator by the pipe 116, through the measuring valve 88 into the casing of the heat interchanger and leaving the casing at the top by the pipe 119 passes out by the nozzle 43 in the chamber 41 of the absorber 42. When working on the surface with the generator 7 the nozzle 43 is always supplied with this weak solution which is forced out from the bottom of the generator by the pressure therein.

Ammonia gas is liquefied at a pressure of 128 lbs. per square inch, at a temperature of 70° F. and at 150 lbs. at a temperature of 77° F. Assuming that the oil motors have run long enough to raise a pressure in the generator say of 160 lbs. the valves 61 and 63 Fig. 7 should be opened to afford communication through the pipes 62 and 64 with the liquefiers or condensers 59 and 60 which are cooled by the circulating pumps 135, 136 passing the water through the casings, the ammonia gas being thus liquefied within the tubes. The ammonia vapor is now confined between the generator and condensers and if the rapid charging of the receivers with anhydrous ammonia is desired, the boat must be run with the oil motors only. The first receiver to be recharged with anhydrous ammonia should be 53 then 52 and then 51. When the cylinders have all been emptied of the anhydrous ammonia it becomes necessary, when recharging, to first feed the generator with some of the strong solution from the absorbers to afford room for the weak solution passing from the generator to the jet nozzle 43. In practice the boat may not remain submerged for a period of seven hours but when frequently coming to the surface the receivers 51 52 and 53 should, as far as possible, be first refilled with anhydrous ammonia, after which the ammonia solution in receiver 50 can be used in the generator and the vapor passed out by the pipe 20 and by the pipes 21 to the ammonia cylinders 4. The motors 3 may now be worked as internal combustion and ammonia engines combined, and owing to the low temperature and the smaller number of heat units required for equal volumes and pressures of ammonia gas compared with steam, with the available waste heat when working in combination with the ammonia cylinders, the power of the oil motors can be doubled. When operating the oil motors in combination, the pump barrel 87 draws the solution from the absorber 38 by the pipe 121 near the top and delivers it by the pipe 124 Figs. 4 and 5 into the absorber 27 to compensate for the weak solution discharged from the bottom of the generator.

I wish it to be understood that I do not limit myself to the exact construction and arrangement of the apparatus above described since the same may be varied within certain limits without departing from the spirit of the invention.

What I claim as my invention and desire to secure by Letters Patent of the United States is:—

1. The combination of a driven member, an oil motor and an ammonia motor connected to be severally and collectively operative on said driven member, means for storage of and supply of ammonia to the ammonia motor and means operatable by the oil motor for regenerating the ammonia supply.

2. The combination of a driven member, an oil motor and an ammonia motor connected to be severally and collectively operative on said driven member, an ammonia generator in communication with the exhaust of the oil motor, means for supplying ammonia from the generator to the ammonia motor, an absorber, means for passing the gaseous exhaust from the ammonia motor to said absorber and means for returning ammonia in solution from the latter back to the generator.

3. The combination of a driven member, an oil motor and an ammonia motor connected to be severally and collectively operative on said driven member, an ammonia generator comprising a main chamber, a series of tubes therein, an intermediate chamber in communication with the exhaust of the oil motor, a series of tubes in said intermediate chamber, a water separator above said intermediate chamber, and a series of baffles in said separator, the latter being in communication with the main chamber through the aforesaid series of tubes in the intermediate chamber; means for supplying ammonia from the generator to the ammonia motor, a series of interconnected absorbers, means for passing the exhaust of the ammonia motor to the first of said absorbers, and means for returning ammonia in solution from the latter back to the generator.

4. The combination of a driven member, an oil motor having a water jacket and an ammonia motor connected to be severally and collectively operative on said driven member, an ammonia generator in communication with the exhaust of the oil motor, means for supplying ammonia from the generator to the ammonia motor, a series of interconnected absorbers, means for passing the gaseous exhaust from the ammonia motor to the first of said absorbers, a heat interchanger means for returning strong ammonia solution from the first absorber through the heat interchanger and oil motor water jacket back to the generator, and means in the last absorber for completely absorbing gaseous exhaust arriving therein from a preceding absorber.

5. The combination of a driven member, an oil motor, and an ammonia motor connected to be severally and collectively operative on said driven member, an ammonia generator, means for passing exhaust gases from the oil engine through the generator, means for supplying ammonia from the generator to the ammonia motor, a series of interconnected absorbers, refrigerating coils therein, an auxiliary anhydrous ammonia receiver in communication with said refrigerating coils, means for passing products of evaporation in said coils to the ammonia motor, means for passing the gaseous exhaust from the ammonia motor to the first of said absorbers and means for returning ammonia solution from the latter back to the generator.

6. The combination of a driven member, an oil motor and an ammonia motor connected to be severally and collectively operative on said driven member, a plurality of anhydrous ammonia receivers means for supplying the contents of said receivers after vaporization successively to the ammonia motor, an absorber, means for passing the gaseous exhaust from the ammonia motor to said absorber, and means for passing overflow from the absorber back to emptied receivers.

7. The combination of a driven member, an oil motor, and an ammonia motor connected to be severally and collectively operative on said driven member, an ammonia generator, means for passing exhaust gases from the oil engine through the generator, a plurality of anhydrous ammonia receivers, evaporating coils in communication therewith, means for passing the vapor produced in said coils to the ammonia motor, an absorber, means for passing the gaseous exhaust from the ammonia motor to said absorber, means for recharging emptied receivers with liquefied ammonia from the generator.

8. The combination of a driven member, an oil motor having a water jacket and an ammonia motor connected to be severally and collectively operative on said driven member, an ammonia generator, means for passing exhaust gases from the oil engine through the generator a plurality of anhydrous ammonia receivers adapted to be successively placed in communication with the ammonia motor, evaporating coils in communication with said receivers, means for passing vapor produced in said coils to the ammonia motor, a plurality of absorbers connected in series, refrigerating coils in said absorbers, means for supplying said refrigerating coils with anhydrous ammonia from a receiver aforesaid, means for passing gaseous exhaust from the ammonia motor to the first of said absorbers, means in the last absorber for completely absorbing gaseous exhaust arriving therein from a preceding absorber, a heat interchanger means for passing strong ammonia solution from the first absorber through the heat interchanger and oil motor jacket back to the generator, a measuring valve and means for passing weak ammonia solution from the generator through said measuring valve and the heat interchanger to the aforesaid absorbing means in the last absorber.

9. The combination of a driven member, an oil motor having a water jacket and an ammonia motor connected to be severally and collectively operative on said driven member, an ammonia generator, means for passing exhaust gases from the oil engine through the generator a plurality of anhydrous ammonia receivers adapted to be successively placed in communication with the ammonia motor, evaporating coils in communication with said receivers, means for passing vapor produced in said coils to the ammonia motor, a plurality of absorbers connected in series, refrigerating coils in said absorbers, means for supplying said refrigerating coils with anhydrous ammonia from a receiver aforesaid, means for passing gaseous exhaust from the ammonia motor to the first of said absorbers means for passing overflow of ammonia solution from said first absorber to emptied receivers, means in the last absorber for completely absorbing gaseous exhaust arriving therein from a preceding absorber, a heat interchanger means for passing strong ammonia solution from the first absorber through the heat interchanger and oil motor jacket back to the generator, a measuring valve, means for passing weak ammonia solution from the generator through said measuring valve and the heat interchanger to the aforesaid absorbing means in the last absorber and means for recharging emptied receivers with liquefied ammonia from the generator.

10. The combination of a driven member an oil motor, and an ammonia motor adapted to be severally and collectively operative on said driven member, an ammonia generator, means for passing exhaust gases from the oil engine through the generator, a plurality of anhydrous ammonia receivers, evaporating coils in communication with said receivers means for passing vapor produced in said coils to the ammonia motor, a plurality of absorbers connected in series, refrigerating coils in said receivers in communication with an anhydrous ammonia receiver aforesaid, means for passing vapor produced in said refrigerating coils to the ammonia motor, means for passing gaseous exhaust from the ammonia motor to the first of said absorbers, means for passing overflow of ammonia therefrom to emptied receivers, an ammonia spray in the last of said absorbers, a heat interchanger, means for passing strong ammonia solution from the first absorber through the heat interchanger back to the generator, means for replacing the ammonia solution removed from the first absorber by other solution from following absorbers, a measuring valve, means for passing weak ammonia solution from the generator through said measuring valve and heat interchanger to the aforesaid spray in the final absorber a condenser, and means for passing ammonia from the generator through said condenser to the anhydrous ammonia receivers.

11. The combination with a navigable vessel of a propelling member, an oil motor, and an ammonia motor connected to be severally and collectively operative on said driven member, a plurality of anhydrous ammonia receivers, evaporating coils in communication therewith, adapted to be surrounded by the water of flotation, means for passing the vapor produced in said coils to the ammonia motor and means operatable by the oil motor for regenerating the ammonia supply.

In witness whereof I have signed this specification in the presence of two witnesses.

JOHN ROBSON.

Witnesses:
J. A. DIXON,
ARCH. ROXBURGH.